UNITED STATES PATENT OFFICE 2,386,283

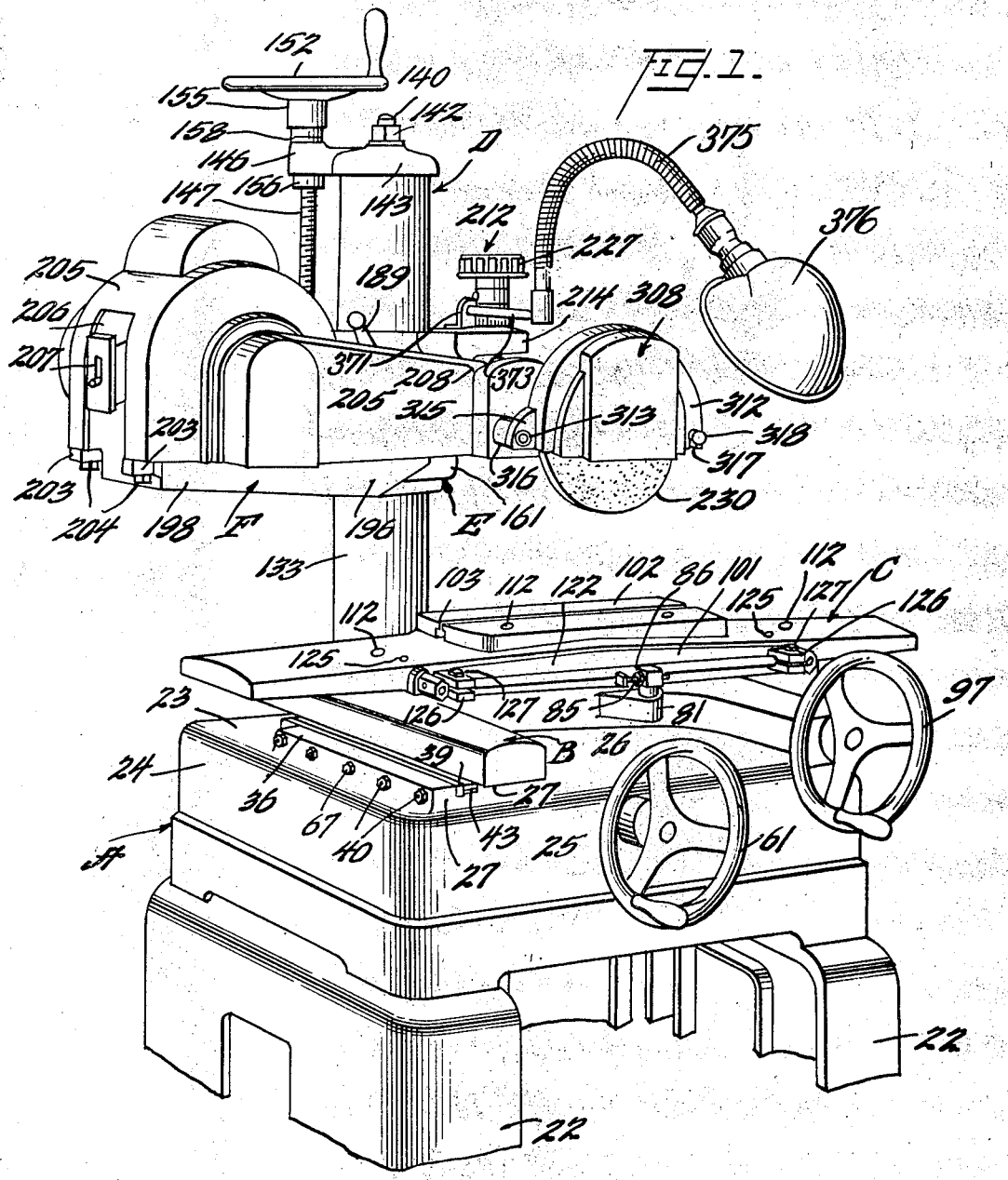

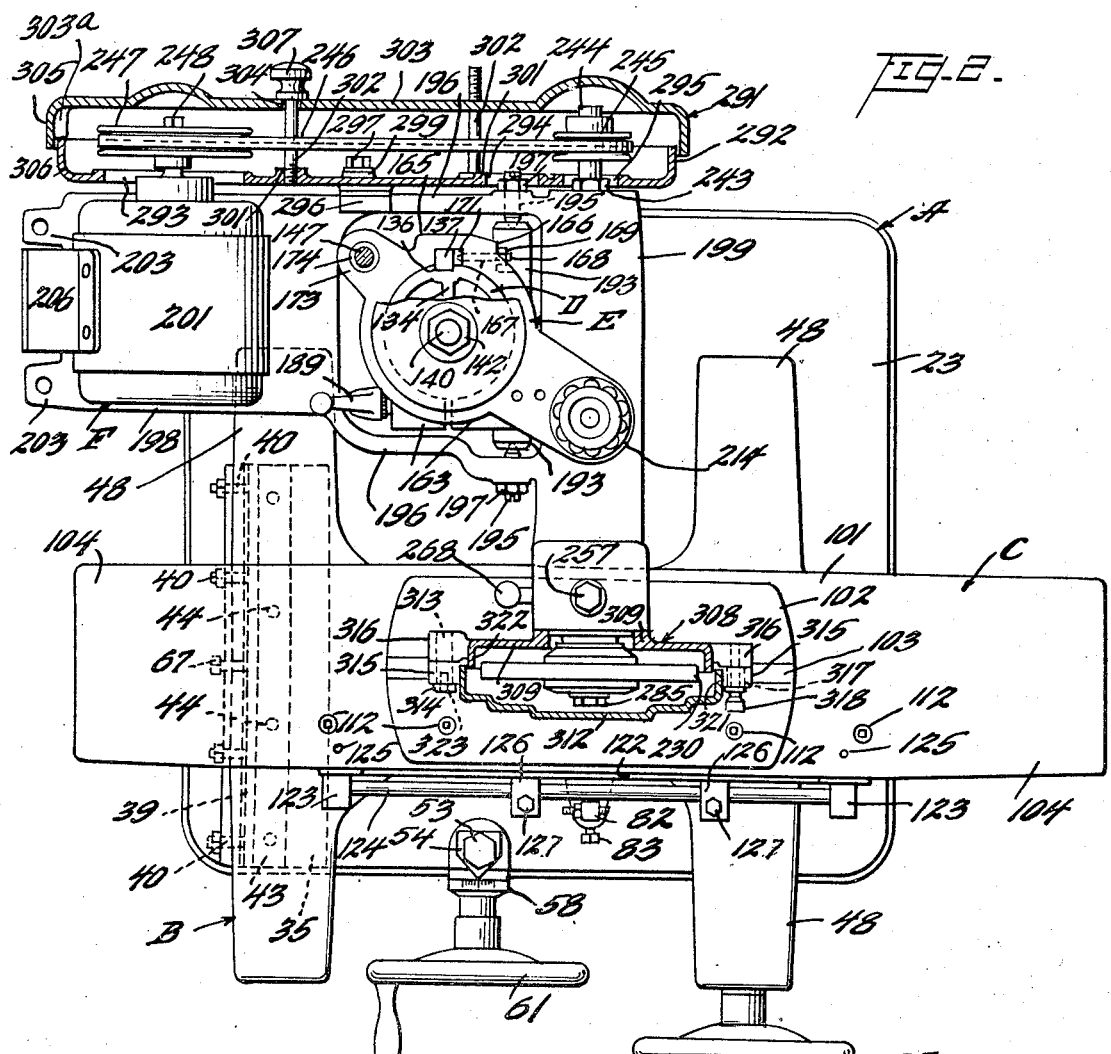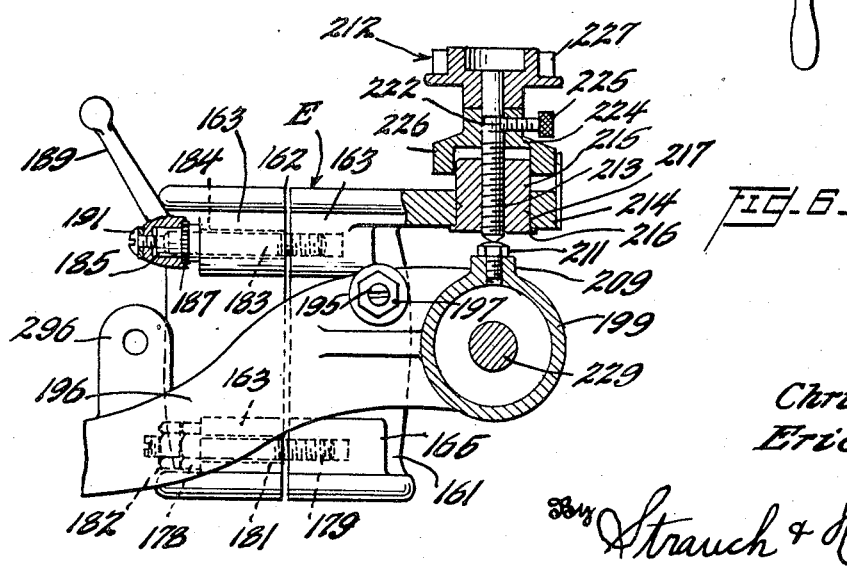

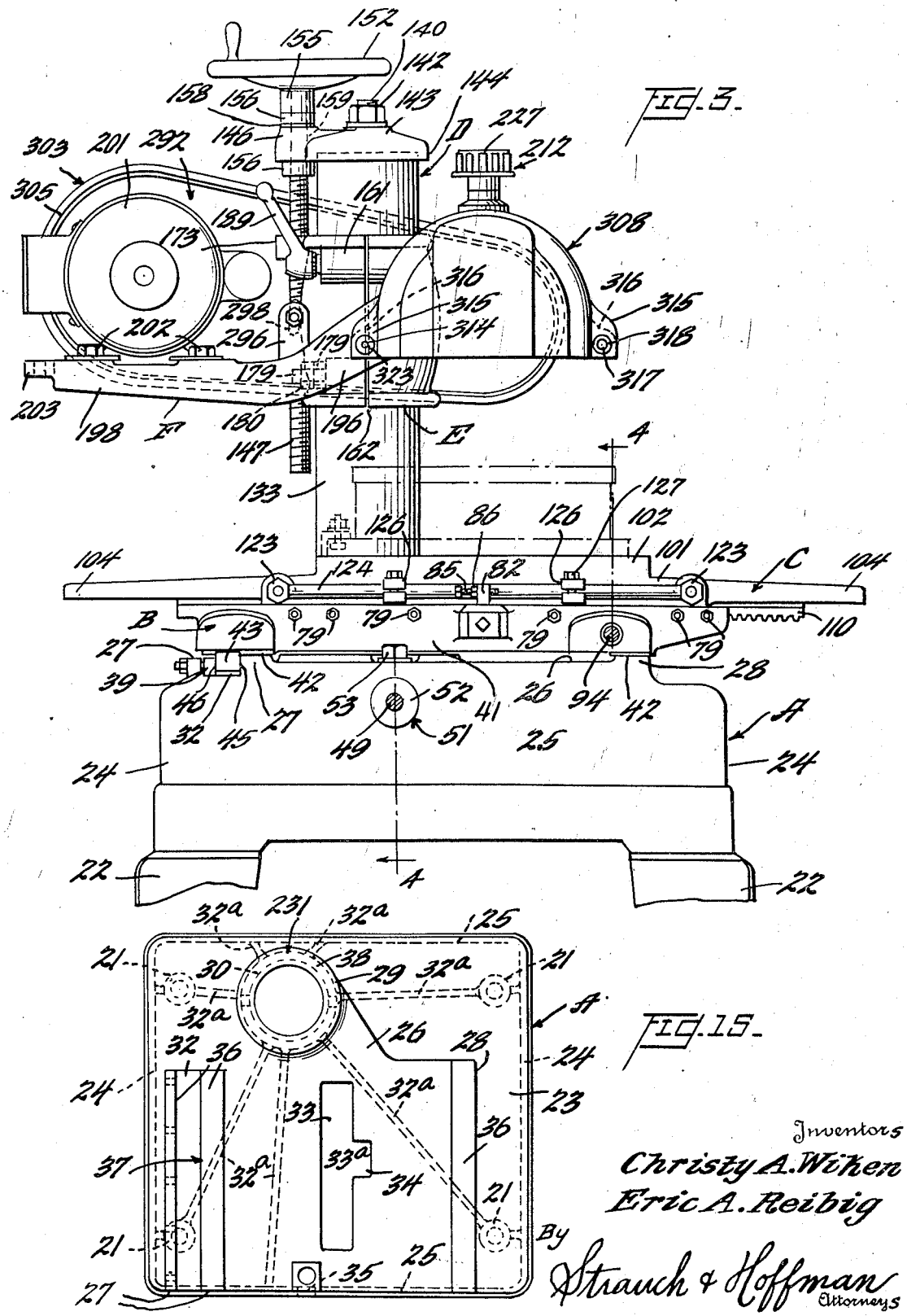

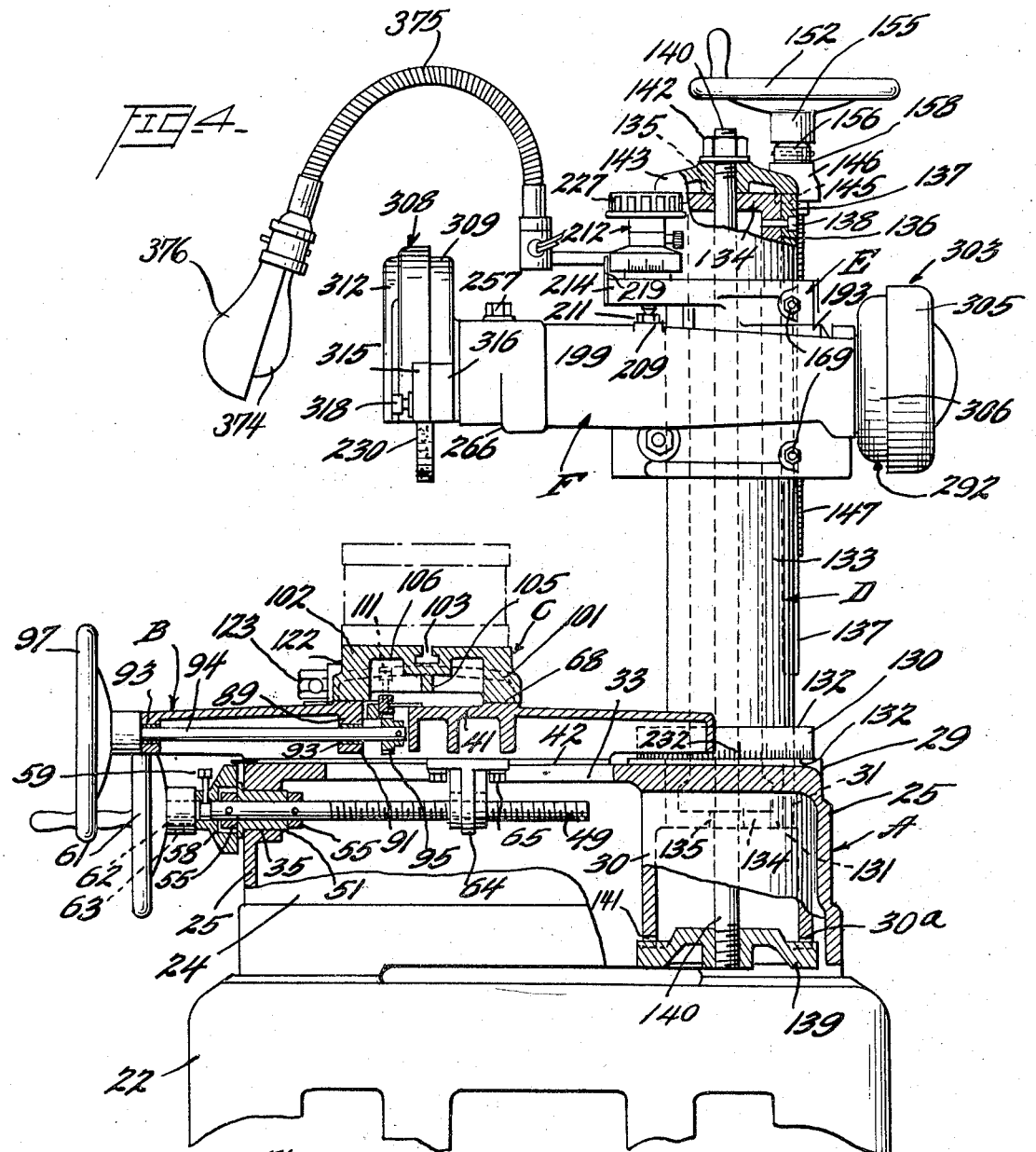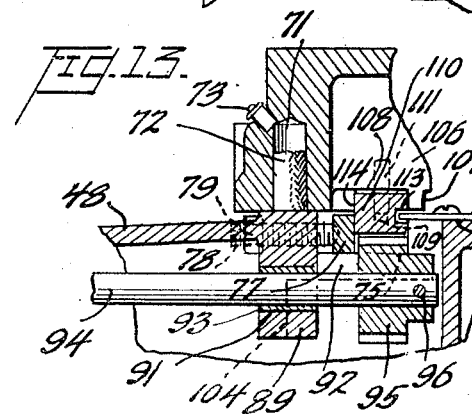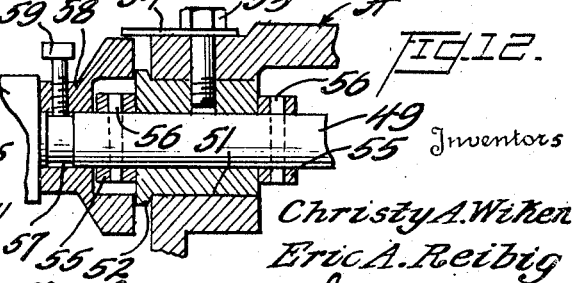

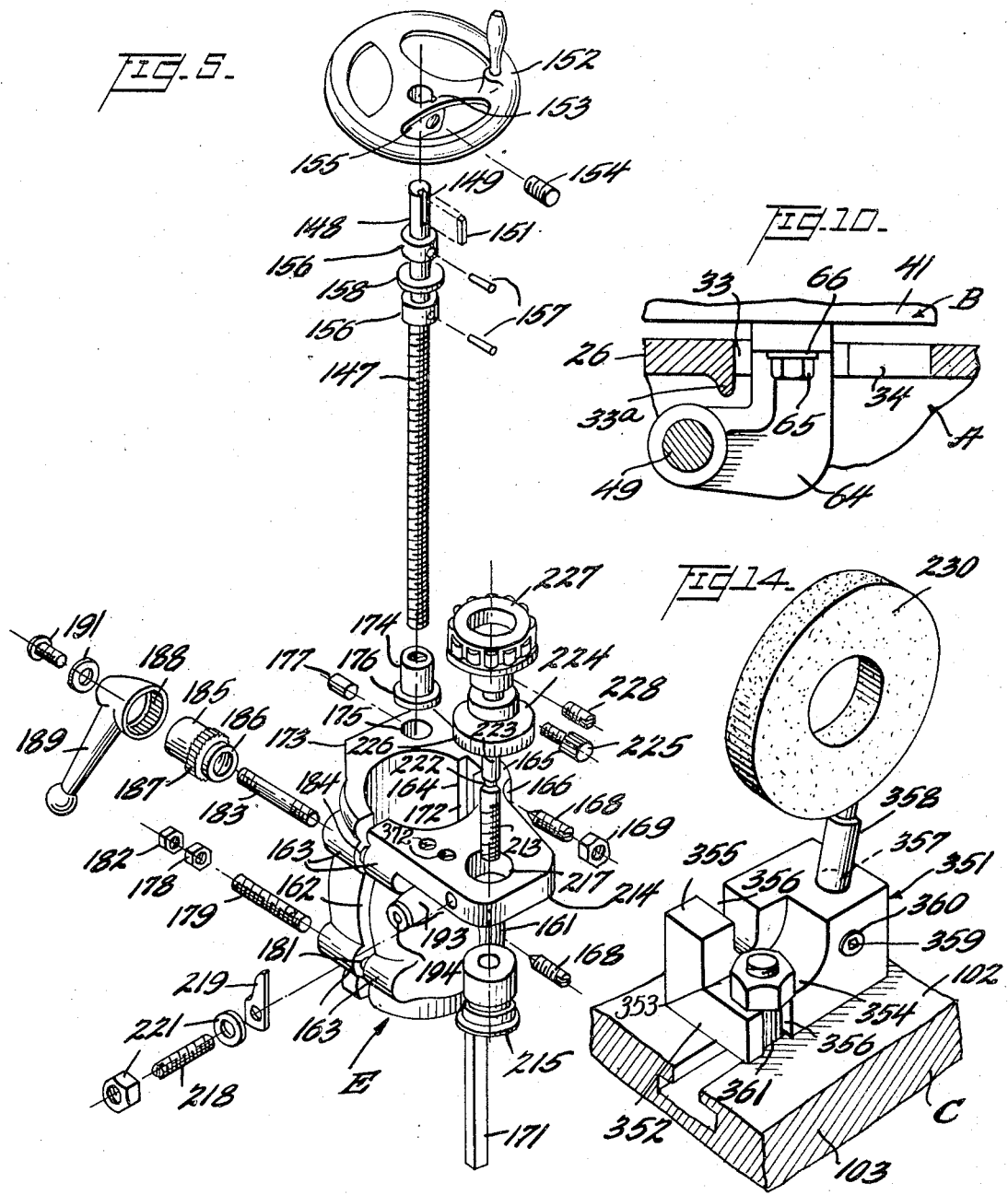

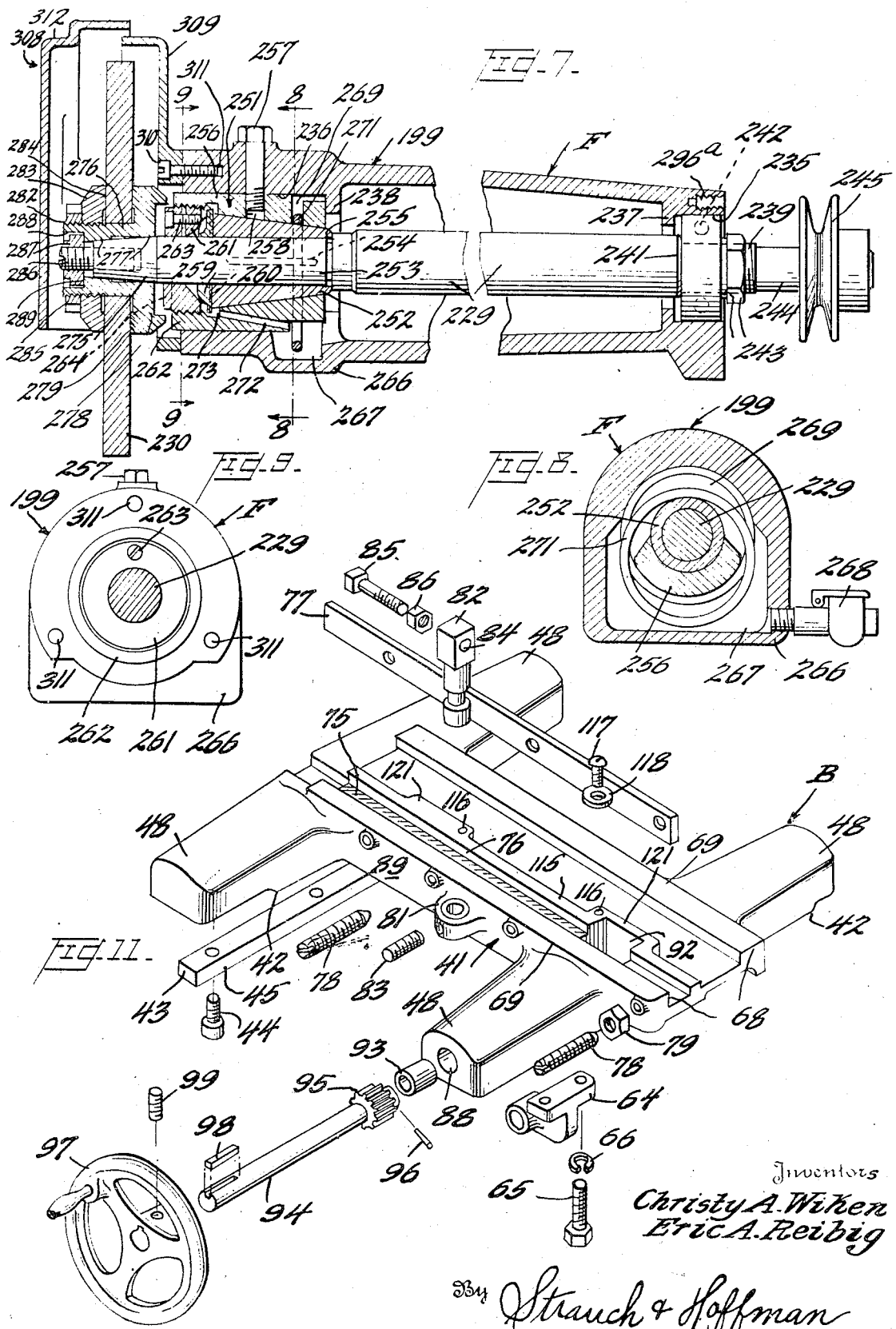

MACHINE TOOL

Christy A. Wiken and Eric A. Reibig, Milwaukee, Wis., assignors, by mesne assignments, to The Delta Manufacturing Company, Milwaukee, Wis., a corporation of Wisconsin Application December 1, 1942, Serial No. 467,512

18 Claims. (Cl. 51—93)

This invention relates to machine tools, and more particularly to grinding machines of the character known in the art as surface grinders, although it is not limited to such use.

The surface grinders now in use are extremely expensive because of the complicated and difficult machining operations required to produce the accurate supports and guideways for the movable tables and the vertical column and slide for supporting the wheel and motor assembly. These complicated and expensive machining operations are eliminated by the simple construction of the present invention which enables a surface grinder to be built up of simple castings and standard commercial stock, requiring simple surface grinding of the interfitting guides and other parts. To this end, the guides and racks for the movable tables and the vertical slide adapted to support the grinding wheel, its spindle and the motor, are formed from commercial cold rolled steel stock and slidably cooperate with surfaces which can be accurately formed by simple surface grinding and simple milling operations to obtain the required accuracy.

Accordingly the primary object of the present invention is to provide a grinder for accurate work utilizing standard stock and avoiding expensive machining and hand fitting of the working parts, and yet enabling highly accurate work to be turned out.

It is a further important object to provide a novel mounting and support assembly for the spindle of a grinding wheel which reduces side and end play to a minimum, assuring accurate and true rotation of the grinding wheel throughout the life of the machine.

Another object of this invention is to provide a grinder having a pivotally mounted frame for supporting the grinding wheel spindle, with a micrometer adjustment in which the pivotal axis of the frame is so located with respect to the micrometer adjustment that actuation of the micrometer adjustment a predetermined amount actuates the spindle an exactly equal amount, with a minimum of sliding, insuring vibration-free operation.

Still another object of this invention is to provide a novel slide arrangement for the traversing and feed tables of a grinder or the like.

A further object is to provide a novel column structure for mounting the motor, spindle and cutting tool for accurate controlled sliding movement along the column.

A further object resides in providing a novel support of simple design for mounting a dressing tool on the work table of a grinder in position to dress either conventional surface grinding wheels or cup wheels.

The invention further aims to provide additional subordinate grinding machine improvements, including novel feeding mechanisms for the traversing and feeding tables; improved means for securing the column to the machine base, permitting adjustment of the column about its axis to locate the wheel out of parallel with the direction of feed of the work; improved wheel and motor guard assemblies; and other improvements and refinements to be hereinafter pointed out.

Further objects will appear from the following description and appended claims when read in conjunction with the attached drawings wherein:

Figure 1 is a pictorial view of the grinder of the present invention.

Figure 2 is a plan view of the grinder of Figure 1 with certain parts in section or broken away and the cover for the motor removed.

Figure 3 is a front elevational view of the grinder of Figure 1 with the cover for the motor and the hand wheels for operating the table removed.

Figure 4 is a sectional view taken substantially on line 4—4 of Figure 3 with the work supporting table moved toward its extreme right-hand position in Figure 3 and the section line passing through the left-hand end of the work supporting surface.

Figure 5 is an enlarged exploded view of the slide member and its associated parts.

Figure 6 is an enlarged fragmental view showing the relationship between the pivotal axis of the motor and spindle supporting frame and the micrometer adjustment carried by the slide member.

Figure 7 is an enlarged sectional view illustrating the details of the spindle and its mounting in the motor and spindle supporting frame.

Figure 8 is a sectional view taken substantially on the line 8—8 of Figure 7 looking in the direction of the arrows.

Figure 9 is a sectional view taken substantially on the line 9—9 of Figure 7 looking in the direction of the arrows.

Figure 10 is an enlarged detailed view illustrating the L-shaped bracket provided for supporting the traversing screw of the traversing table in offset relation to the open slot provided in the traversing table.

Figure 11 is an enlarged exploded view of the traversing table and its associated parts.

Figure 12 is an enlarged detailed fragmental sectional view showing the manner in which the traversing screw is journalled in the wall of the base of the grinder.

Figure 13 is an enlarged sectional view showing in detail the manner in which the feed screw of the feed or work table is mounted in the traversing table and the feed and slide mechanism for the feed or work table.

Figure 14 is a fragmental view illustrating the novel dressing tool and holder of the present invention mounted on the work table in position for dressing a surface wheel which is shown in its proper relation to the dressing tool and the work table; and Figure 15 is a top plan view of the base of the grinder illustrated in Figures 1 to 14.

With continued reference to the drawings wherein like reference numerals are used to designate the same parts throughout the several figures of the drawings, the improvements of this invention are illustrated in connection with a grinder in which they are particularly useful. The grinder comprises a novel base A, a traversing table or cross slide B, a work-supporting table or top slide C, a column D, a slide member or column sleeve E mounted for sliding movement on column D, and a combined motor supporting and spindle housing frame F. While these various elements are in general well known in the machine tool art, they are formed and assembled in a novel manner by the present invention to produce an improved machine which can be built at minimum cost from readily available commercial stock while eliminating complicated and expensive machining operations and hand fitting now required to produce grinders of comparable capacity and accuracy. Heretofore this type of machine has been built in rather small lots in both foundry and machine shops, resulting in higher costs, due to greater handling and setting up, for producing the parts. The present invention makes it possible to tool up in both the foundry and machine shop to produce these machines in larger quantities, with all parts interchangeable. In this connection, the present invention provides a basic surface grinding machine which may be used for special operations, now requiring several machines or extremely expensive machines, merely through the use of relatively inexpensive attachments, not claimed in this application, capable of being readily secured to the work-supporting table. While the grinder may be secured to any suitable support such as a table or the like through the use of the bolting-down pads 21 (Figure 15) of base A, a set of supporting legs 22 shown in part in Figures 1, 3 and 4 is preferably provided.

Base A is a casting made of regular gray iron and need not be annealed before machining, as the design thereof largely eliminates strains. As clearly seen in Figures 1, 4 and 15, base A is deep and has a top wall 23, side walls 24, front and rear walls 25 and an open bottom. Portion 26 of top wall 23 is raised slightly and is provided with upstanding longitudinally extending lands 27 and 28 and an annular land 29. As clearly seen in Figure 15, land 29 is located beyond one end of lands 27 and 28 adjacent rear wall 25 and is provided with an annular bore 31. Land 27 is provided with a guideway 32 and the underside of top 23 below land 29 is provided with an annular, downwardly extending boss 30 containing a continuation of bore 31 terminating in an enlarged concentric portion. Ribs 32a diverge from boss 30 to pads 21 and the walls 25 to give maximum stiffness without excessive metal thickness at any point. As a consequence, base A is stiff enough to permit legs 22 to stand on a rather uneven floor without distortion or harmfully affecting operation of the tables B and C, column D or the quality of grinding.

Portion 26 of top 23 is also provided with a slot 33 having a notch 34 along one side approximately midway between its ends and front wall 25 is provided with an aperture 35 in a plane offset from the axis of slot 33. The purpose of slot 33, notch 34 and aperture 35 will presently appear as the description proceeds.

Lands 27 and 28 are accurately machined to provide longitudinally extending, horizontal slides 36 in a common plane for supporting table B for traversing movement in a horizontal plane across base A toward and away from annular land 29. The vertically extending wall 37 of guideway 32 is accurately machined to provide a guiding surface normal to the plane containing slides 36 and normal to a plane passing through the axis of bore 31 at right angles to side walls 24. Land 29 is also machined to provide a surface 38 lying in the plane containing slides 36. The remainder of base A is left in its original cast state since the machined surfaces referred to above are the critical surfaces. It is obvious that the machining operations required on base A are simple, inexpensive operations and that a minimum amount of machining is required because of the relatively small areas of the machined surfaces. A gib 39 is disposed in guideway 32 and is adapted to be forced toward wall 37 by studs 40 for a purpose to be presently pointed out.

Table B is designed to rest on slides 36 and be guided for movement along said slides by a novel guide construction cooperating with wall 37 of guideway 32. To this end the body portion 41 of table B has depending lands 42 at its ends designed to slidingly contact slides 36. Lands 42 are normal to the longitudinal axis of body 41 and their under surfaces are accurately machined to provide slides in a common plane for sliding cooperation with slides 36 of base A. The land 42 cooperating with land 27 of base A has a guide bar 43 removably secured to it by means of screws 44 the heads of which are counter-bored into the bar 43. Bar 43 is made of cold rolled steel stock and is secured to land 42 in such a manner that its vertical sides 45 and 46 are normal to the longitudinal axis of body portion 41. As clearly shown in Figure 1 and Figure 3 guide bar 43 is disposed in guideway 32 with its vertical wall 45 in contact with vertical wall 37 of guideway 32. Gib 39 in guideway 32 is forced against wall 46 of guide bar 43 by means of studs 40 until walls 45 and 37 are in full but sliding contact from end to end. Lock nuts 47 on studs 40 are then tightened to secure guide bar 43 in its adjusted position against wall 37 and table B is constrained to move toward and away from land 29 in a path determined by wall 37 and in a plane determined by slides 36 and the slides provided by depending lands 42 of table B. These slides are covered and protected in all positions of table B by extensions or aprons 48 cast integral with body 41 and lands 42.

In order to move or traverse table B along slides 36, a cross feed screw 49 (Figures 4 and 12) is provided. Feed screw 49 is journalled in aperture 35 of front wall 25 of base A by means of a journal bearing 51 having an annular flange 52 at its outer end. Flange 52 abuts the outer face of wall 26 and is held against axial movement in aperture 35 by means of a cap screw 53 which also secures pointer 54 to the top of base A. Annular collars 55 are secured to feed screw 49 on either side of journal bearing 51 by tapered pins 56. Collars 55 are of lesser diameter than aperture 35 for a purpose to be presently described.

Just beyond the outermost collar 55 feed screw 49 has a reduced portion 57. A micrometer sleeve 58 adapted to cooperate with pointer 54 is mounted on feed screw 49 at this point by means of a set screw 59 and a hand wheel 61 is keyed to the outer end of feed screw 49 by a key 62 and retained in abutting engagement with micrometer sleeve 58 by a set screw 63. Micrometer sleeve 58 may be properly set by hand merely by loosening set screw 59. From the foregoing description, it is clear that feed screw 49, journal bearing 51 and their associated parts are secured together to form a unitary assembly. As a consequence and since collars 55 are of lesser diameter than aperture 35, this assembly may be mounted in and removed from aperture 35 as a unit upon manipulation of cap screw 53.

As heretofore pointed out aperture 35 is offset from slot 33. It follows, therefore, that cross feed screw 49 will be similarly offset to protect it from foreign matter that might fall upon it through slot 33. To operatively connect cross feed screw 49 and table B, an L-shaped bracket or cross slide nut 64 is secured to the underside of body portion 41 of table B by a pair of cap screws 65. Lock washers 66 prevent inadvertent loosening of cap screws 65 in well known manner. Bracket 64 is attached to table B prior to the assembly of the table on base A and is adapted to be inserted through slot 33 and notch 34 and then moved over until the nut portion is aligned with aperture 35 of base A to be in position to receive feed screw 49. After table B is adjusted to the desired position along slides 36 by hand wheel 61, micrometer sleeve 58 and feed screw 49, table B is locked in position by securing gib lock cap screw 67. To give additional protection against dust falling onto the screw a depending flange 33a is located at the edge of opening 33 adjacent the screw.

The upper surface of body portion 41 is of channel-like shape in cross-section and provides upwardly extending legs 68 of substantial width. The upper surfaces of legs 68 are machined to provide slides 69 in a common plane extending in a direction normal to slides 36.

Adjacent one leg 68, preferably the one toward front wall 25 of base A, there is provided a guideway 75 having a vertical wall 76 accurately machined to provide a surface for guiding table C in a path normal to the path of table B. A gib 77 is adapted to be disposed in guideway 75 in spaced relation to wall 76 and gib screws 78 and lock nuts 79 are provided for moving gib 77 toward wall 76 and retaining it in its adjusted position in the manner previously described in connection with gib 39.

An ear 81 is formed on the front vertical wall of body portion 41 for removably and rotatably receiving a center stop 82 which is secured in ear 81 by means of a set screw 83. Center stop 82 is designed to limit the movement of table C in either direction and prevents table C from becoming disengaged from table B. To this end, a threaded aperture in center stop 82 is adapted to receive an adjustable stop screw 85, and a lock nut 86 is provided to retain the screw adjustment after it has been set. It is to be understood that center stop 82 is not assembled until table C has been mounted on table B, and that it must be removed to permit disassembly of table C as will presently appear.

The front apron 48 at the end of table B opposite the end provided with guide bar 43 has an aperture 88 formed in its front vertical wall and the depending front wall 89 of body portion 41 is provided with an aligned aperture 91 intersecting a vertical opening 92 formed in body portion 41 and guideway 75. Apertures 88 and 91 are provided with bearing sleeves 93 designed to journal pinion shaft 94 having pinion 95 secured on one end by a tapered pin 96. As clearly seen in Figure 13, pinion 95 is received in opening 92 and its upper portion extends up into guideway 75. A hand wheel 97 is keyed to the opposite end of shaft 94 by a key 98 and is secured to the shaft by a set screw 99. The pinion 95 in combination with means on table C to be presently described is adapted to move work table C back and forth to feed the work to the cutting tool.

Work-supporting table C comprises a body section 101 having a raised work-supporting surface 102 provided with a longitudinally extending T-slot 103 in well known manner. Longitudinally extending extensions or aprons 104 are provided on the ends of body section 101 for a purpose to be presently pointed out. The underside of body section 101 has a central longitudinally extending web 105 interconnecting end walls 106. At longitudinally spaced points along one side of table C the underside of body section 101 is provided with bosses 107 extending downwardly to the plane of slides 69. Each of these bosses is provided with a notch 108 and a vertically extending bore 109. Notches 108 are longitudinally aligned and designed to receive a rack bar 110 which is positioned in predetermined relation parallel to wall 76 of table B by the vertical walls of notches 108. Cap screws 111 passing through apertures 109 and having their heads received in countersunk openings 112 in the top of table C retain rack bar 110 in assembled relation in notches 108. To assure proper positioning of rack bar 110 in notches 108, screws 111 have sufficient play in apertures 109 to permit slight sidewise movement of rack bar 110 in notches 108.

The rack bar 110 extends downwardly into guideway 75 of table C into engagement with pinion 95 and one vertical side wall is longitudinally grooved at 113 and designed to slidingly engage wall 76 of table B to guide table C in its movement on table B. To assure proper contact between rack bar 110 and wall 76, gib 77 is forced into contact with the other wall 114 of rack bar 110.

Lubrication of the slides is preferably provided as seen in Figure 13, by providing the work table with a pair of vertical oil ducts 71, which open out onto slides 69 of the sub-table and carry wicks 72 at their lower ends, for evenly and slowly feeding oil to the slide surfaces. Oil may be introduced through dust-proof oiler fittings 73. While only one oiler assembly is shown in Figure 13, it is to be understood that an exactly similar one is associated with the other slide 69 at the other side of the table. It has been found that this will effectively oil the device and it possesses the further advantage that fresh oil flowing down onto the slides tends to wash away any dust-laden oil and keep the slide surfaces clean.

As clearly seen in Figure 13, groove 113 of rack bar 110 has its lower horizontally extending wall slightly below the plane of an upstanding, centrally disposed, longitudinally extending flange 115 formed on table B between legs 68. Flange 115 at spaced points along its length is provided with threaded apertures 116 adapted to receive screws 117 which secure washers 118 to flange 115 with a portion of their peripheral edges extending into groove 113 but spaced from the top and bottom walls thereof. Washers 118, accordingly, prevent table C from being lifted sufficiently to disengage rack bar 110 from pinion 95, and thereby prevent assembly and disassembly of tables B and C except by relative sliding movement along guideway 75 and slides 69. Also, they make it possible for table C to be moved into either of its extreme positions without any danger of table C tilting and becoming disassembled from table B, for instance when work is being handled whose center of gravity lies outside the table surface.

Table C on its front vertical wall 122 is provided with spaced apart stop rod holders 123 designed to receive a stop rod 124. Stop rod holders 123 are secured to table C by set screws (not shown) threaded into apertures 125 in the top of table C. Set screws (not shown) are also threaded into the ends of stop rod holders 123 to secure stop rod 124 in place. Stop rod blocks 126, in the form of split C-clamps, are adjustably secured on stop rod 124 by means of clamp bolts 127. These stop blocks cooperate with screw 85 and may be adjusted along bar 124 to stop the table in any position desired.

The work-supporting surface 102 of table C as heretofore pointed out is provided with the conventional T-slot 103. A work-piece may, therefore, be secured to surface 102 by any of the conventional T-bolt clamp devices or, if desired, a universal vise or other special work holding or supporting device may be secured to surface 102 by means of T-slot 103. In addition surface 102 is also designed to receive a conventional magnetic chuck such as the Brown and Sharpe "magnetic chuck" which is shown in dot and dash lines in Figures 3 and 4.

Column D which supports frame F is provided with an external annular flange 130 adjacent its lower end 131 and is ground along its length and on the upper and lower faces 132 of flange 130 to assure a perfect right angular relation between its annular slide surface 133 and faces 132 of flange 130. Column D is hollow and at its ends is provided with webs 134 having central bores 135 formed therein for a purpose to be presently pointed out.

As clearly seen in Figure 4, end 131 is disposed in bore 31 of base A with the lower face 132 of flange 130 in contact with the machined surface 38 of land 29. Along one side column D is provided with a longitudinally extending groove 136 which is adapted to receive guide bar 137. Screws 138 secure guide bar 137 in groove 136 and the groove and guide bar are accurately located to assure the positioning of guide bar 137 vertically and at right angles to land 29 and tables B and C.

A threaded shaft 140 extends upwardly through apertures 135 in webs 134 and at its lower end is provided with a threaded plate 139 having a plurality of upwardly facing lugs 141 designed to engage notches 30a of boss 30 and prevent rotation of shaft 138 when nut 142 is applied at the top. As clearly seen in Figures 3 and 4 the upper end of column D is provided with a cap 143 having a depending annular flange 144 containing a notch 145 designed to receive the upper end of guide bar 137 to definitely locate cap 143 in predetermined angular relation to the upper end of column D. Cap 143 is also secured in place by bolt 138 and nut 142 and is provided with an offset ear 146 designed to receive raising screw 147 for raising and lowering slide member E. As clearly seen in Figure 5, raising screw 147 at its upper end has an unthreaded portion 148 having a keyway 149 for receiving a key 151. A hand wheel 152 is mounted on the extreme end of the unthreaded portion 148 and is provided with a keyway 153 designed to cooperate with key 151 to connect hand wheel 152 and raising screw 147 for unitary rotation. A set screw 154 passing through hub 155 of hand wheel 152 prevents axial displacement of hand wheel 152 and raising screw 147.

Immediately below and in contact with the hub 155 of hand wheel 152 screw 147 is provided with an annular collar 156 secured to screw 147 by a tapered pin 157 and a fibre washer 158 is slid into engagement with the opposite end of collar 156. The lower end of screw 147 is then passed through aperture 159 of ear 146 and a collar 156 is secured to screw 147 just below and in contact with the undersurface of ear 146. A pin 157 secures the last mentioned collar 156 to screw 147. From the foregoing description, it will be seen that screw 147 is rotatably mounted in ear 146 but is held against axial movement by collars 156 and that the weight of the screw 147, hand wheel 152 and its associated mechanism is supported by ear 146. Washer 158, however, takes the wear incident to rotation of screw 147 and may be readily replaced when worn. As a consequence, there is no appreciable wear on the upper surface of ear 146.

It will be clear from the preceding description that column D is accurately mounted on base A and that no further fitting of the column is required. As a consequence, the further fitting operations required on the conventional planed and scraped V-way columns is wholly eliminated.

As previously pointed out, column D supports slide member E for sliding movement therealong. To this end slide member E comprises a sleeve-like body member 161 split axially at 162 and having spaced bosses 163 adjacent its upper and lower ends. The inner wall of member 161 opposite axial split 162 is provided with an axially extending guideway 164 designed to receive guide bar 137. As clearly shown in Figure 2, the wall of member 161 adjacent guideway 164 is substantially thicker at 165 to provide for the guideway and at spaced points adjacent the top and bottom of this thickened area flats 166 are formed to provide nut bearing surfaces. Threaded apertures 167 interconnect flats 166 and guideway 164 and are designed to receive gib screws 168 which are adapted to be locked in adjusted position by nuts 169. A gib 171 is adapted to fit into guideway 164 against guide bar 137. Tightening of gib screws 168 forces gib 171 toward wall 172 of guideway 164 and draws wall 172 into intimate sliding engagement with guide bar 137 throughout its length to assure movement of slide member 161 in a true vertical path along column D.

This sliding movement of member 161 is effected by raising screw 147 which is threadedly connected to ear 173 of member 161 by means of a threaded sleeve 174 adapted to closely fit aperture 175 of ear 173. As clearly shown in Figure 5, sleeve 174 at its lower end is provided with an annular shoulder 176. Sleeve 174 is assembled in aperture 175 from the bottom of ear 173 so that shoulder 176 contacts the bottom surface of ear 173. A set screw 177 threaded into ear 173 non-rotatably secures sleeve 174 in aperture 175 and prevents it from falling out upon disengagement of screw 147 and sleeve 174.

From the foregoing description, it will be clear that slide member E is moved along column D in a path determined by wall 172 of guideway 164 when hand wheel 152 is rotated. This movement is effected by the threaded engagement of screw 147 and sleeve 174 since screw 147 is held against axial movement by ear 146 of cap 143 while shoulder 176 of sleeve 174 engages the under surface of ear 173 to lift member 161. Since this lifting force is applied at one point around the periphery of member 161 there is a tendency to tilt member E on column D. To assure accurate movement along column D any looseness between member E and column D must be eliminated. This is accomplished in the present invention by drawing the split member 161 snugly around column D by means of nut 178 on stud 179 which passes freely through aperture 181 in one of the lower bosses 163 and is threaded into the other boss 163. It is to be understood that nut 178 is tightened only to the extent necessary to secure a snug sliding fit between member E and column D. After the desired fit is secured nut 178 is locked in its adjusted position by lock nut 182 and the desired sliding fit is permanently maintained for all future normal grinding operations.

Means is also provided for locking member E in any desired adjusted position along column D. To this end, a stud 183 passes freely through aperture 184 in one of the upper bosses 163 and is threaded into the other boss 163. A threaded sleeve 185 having an annular flange 186 is threaded on the protruding end of stud 183 until face 186 firmly engages the surface of boss 163. The body of sleeve 185 is provided with an annular fluted shoulder 187 adapted to cooperatively engage internal fluting 188 provided in the body of a handle 189 which is secured to sleeve 185 by machine screw and washer assembly 191. Assuming that member E has been brought to the desired position along column D by operation of hand wheel 152 and screw 147, handle 189 is rotated to draw the upper portion of member 161 tightly around column D whereupon member E is locked in its adjusted position. It will be appreciated that this coarse adjustment of member E locates motor supporting and spindle housing frame F in predetermined relation to work-supporting table C since frame F, as previously pointed out, is carried by member E.

While frame F can be secured to member E in any desired manner without affecting the operation of the tables B and C and slide member E, it is a preferred feature of this invention to pivotally mount frame F on slide member E. To accomplish this desired result, body 161 of member E is provided with integrally formed, axially aligned bosses 193 having aligned conical recesses 194 in their ends. Recesses 194 are designed to receive the conical ends of hardened pivot screws 195 which are threaded into the side bars 196 of frame F. Lock nuts 197 secure screws 195 against accidental displacement of pivot screws 195. As clearly shown in Figures 2 and 6, side bars 196 pass along opposite sides of member 161 and at one end merge into a motor mounting base 198 and at the other end into a spindle housing 199. An electric motor 201 of any suitable construction is mounted on base 198 by hold down bolts 202. The protruding end of base 198 is provided with a pair of spaced, apertured ears 203 adapted to receive cap screws 204 for securing a motor housing 205 (Figure 1) to base 198. An opening 206 in the end of motor housing 205 is provided to receive motor switch 207 of any suitable construction. The motor housing 205 extends along one side of column D and covers side bar 196 of frame F and its end 208 is formed to correspond in shape to the peripheral outline of spindle housing 199 which it almost contacts.

Spindle housing 199 approximately midway between its ends is provided with an upstanding threaded boss 209 adapted to receive a hardened micrometer screw abutment button 211 in the form of a cap screw threaded into boss 209. The upper abutment surface of button 211 is made very smooth to assure an accurate reading of the micrometer adjustment and to eliminate inaccuracies which might tend to cause undesired vibration during grinding operations.

A micrometer assembly 212 having a hardened abutment screw 213 adapted to cooperate with button 211 is adjustably mounted in an arm 214 integrally formed on member 161. As clearly seen in Figures 5 and 6, assembly 212 comprises a bronze threaded sleeve or nut 215 having a flange 216 and is carried in an aperture 217 formed in arm 214. Sleeve 215 is separable from ear 214 for ease and cheapness of replacement and is assembled from the bottom of arm 214 and is inserted in aperture 217 with flange 216 abutting the under surface of arm 214. A set screw 218 threaded into an edge of arm 214 secures sleeve 215 against rotation in aperture 217, shoulder 216 accurately seating it within the opening and preventing it from being pushed therethrough. A nut and washer assembly 221 locks the set screw 218 in adjusted position and also clamps a pointer 219 to arm 214. Abutment screw 213 is threaded through sleeve 215 into abutting contact with button 211, as shown in Figure 6. Adjacent its upper end, screw 213 is provided with a groove 222 and a flat 223. A micrometer sleeve 224 is secured to the screw by a set screw 225 seating in groove 222, with its downwardly extending, graduated flange 226 encircling the upper portion of sleeve 215. A plastic hand knob 227 is secured on the upper end of screw 213 by means of a set screw 228, which engages flat 223 and assures unitary rotation of knob 227 and screw 213.

Referring to Figure 6, it will be seen that the axis of button 211 and micrometer screw 213 are in the vertical plane containing the axis of spindle 229 mounted in housing 199 and that the abutment surface of button 211 and the axis of spindle 229 are respectively equally spaced above and below the horizontal plane containing the axes of pivot screws 195. It will also be clear, from an inspection of Figure 3, that the motor 201 is at a greater distance from pivot screws 195 than housing 199 and spindle 229 and that, as a consequence, abutting engagement of button 211 and screw 213 is assured at all times by reason of the overhanging weight of motor 201. Because of this relationship, rotation of knob 227 and the resultant axial movement of screw 213 will cause a substantially equal vertical movement of button 211 and spindle 229 with a relatively negligible sliding movement between button 211 and the abutting end of screw 213.

Since surface grinding wheel 230 is carried by spindle 229 which is in turn mounted in frame F carried by vertically adjustable slide member E, it will be seen that very accurate vertical adjustment of the height of wheel 230 with respect to work-pieces carried by work table C can be readily effected by the construction of this invention. In this connection, a rough adjustment of the height of wheel 230 is effected by unlocking slide member E through operation of handle 189, rotation of hand wheel 152 and locking of slide member E through reverse operation of handle 189. This rough adjustment, if properly made, will bring wheel 230 within the range of adjustment of micrometer assembly 212, which range of adjustment is preferably about three-eighths of an inch. The micrometer adjustment, which is preferably graduated to .0005 inch, is then brought into play to make the final, fine adjustment for height by pivotal movement around pivot screws 195.

If desired, angular adjustment of wheel 230 with respect to the path of movement of table C may also be readily effected by the improved column structure of this invention. In this connection, land 29 may be provided with a zero mark, such as a notch 231 (Figure 15) for cooperation with appropriate angular graduations 232, including a zero point, formed on the periphery of flange 130. With notch 231 and the zero point matching, the axis of rotation of grinding wheel 230 would be at right angles to the path of movement of table C as shown in the drawings. Such a setting is particularly desired for the usual surface grinding operations. However, if a different angular relationship were desired, the operator need only loosen nut 142 and rotate column D in aperture 31 until the desired angular relationship is indicated by graduations 232 whereupon nut 142 would be tightened to lock column D in its adjusted position.

To gain the full benefits of the accurate construction and adjustments heretofore pointed out, it is necessary to secure true rotation of spindle 229 and wheel 230. To this end, the present invention contemplates a novel mounting for spindle 229 and wheel 230. This novel mounting is shown in detail in Figures 7 to 9 wherein housing 199 at its opposite ends is provided with accurately machined bearing seats 235 and 236. The inner end of each of these bearing seats is provided with an inwardly directed annular flange respectively designated by reference numerals 237 and 238. Spindle 229 adjacent one end is provided with a reduced section 239 forming a shoulder 241. A conventional ball bearing 242 is mounted on section 239 with its inner race clamped between shoulder 241 and a nut and washer assembly 243 threaded onto section 239. The end 244 of spindle 229 beyond nut and washer assembly 243 is still further reduced and is adapted to receive a V-belt pulley wheel 245 secured thereto in any conventional manner. A V-belt 246 connects pulley wheel 245 to a pulley wheel 247 carried by the shaft 248 of motor 201 to establish the driving connection for spindle 229. The outer race of bearing 242 is disposed in seat 235 in spaced relation to shoulder 237. While the outer race fits snugly enough to prevent relative rotational movement between it and seat 235, bearing 242 and spindle 229 are designed for unitary axial movement along seat 235 for a purpose to be presently pointed out.

Seat 236 is adapted to receive a tapered bearing assembly 251. Bearing assembly 251 comprises a tapered bearing sleeve 252 non-rotatably mounted on a reduced section 253 of spindle 229, preferably by shrinking it tightly into place, with its smaller diameter end in contact with a shoulder 255 at the inner end of reduced section 253; a cooperating oppositely tapered bronze bearing sleeve 256 closely fitting seat 236 with its smaller end in abutting engagement with annular shoulder 238 and held against axial and rotational movement without strain by a cap screw 257 projecting through an opening in housing 199 and threaded into an opening 258 in sleeve 256; a self-aligning bronze thrust washer 259 surrounding reduced section 253 of spindle 229 and having its flat face containing radially extending grooves 260 in engagement with the larger end of sleeve 252 and projecting radially beyond the periphery of the larger end of sleeve 252; a split lock nut 261 threaded into the axially extending annular flange 262 of bearing sleeve 256 with the conical bore in its end engaging the rounded end of thrust washer 259; and a locking screw 263 threaded into lock nut 261 to draw the split section together to lock nut 261 to bearing sleeve 256 and having its end extending into an opening in thrust washer 259 to prevent rotation of the thrust washer.

Bearing assembly 251 is designed to eliminate all end and radial play in spindle 229. This is accomplished, after the bearing parts are assembled with respect to housing 199 and spindle 229 as shown in Figure 7, merely by loosening screw 263, engaging a spanner wrench with notches 264 of nut 261 and threading nut 261 into flange 262 of bearing sleeve 256 thereby forcing thrust washer 259, inner tapered bearing sleeve 252 and spindle 229 to the right in Figure 7 until the tapered bearing surfaces of sleeves 252 and 256 are in proper bearing contact. This movement of spindle 229 is readily permitted due to the sliding relation between seat 235 and the outer race of bearing 242. In making this adjustment care should be exercised to avoid jamming the bearing sleeves 252 and 256 to such an extent that proper bearing action cannot take place.

While bearing assembly 251 may be lubricated in any suitable manner, the present invention provides a novel lubrication system wherein the rotation of the spindle 229 and bearing sleeve 252 assures proper lubrication. In this connection, housing 199 has a substantially rectangular formation 266 on its under surface adjacent the inner end of bearing assembly 251. This formation provides an oil reservoir 267 adapted to be supplied with oil through an oil cup 268. Bearing sleeve 256 is provided with an approximately semi-circular notch 269 extending from the top to a point slightly below the axis of spindle 229 on each side and a slinger ring 271 is disposed in notch 269 so as to rest on the tapered surface of bearing sleeve 252 and dip into the oil in reservoir 167. Notch 269 is of sufficient width to permit free rotation of ring 271 due to its contact with sleeve 252. An oil return duct 272 sloping toward reservoir 267 is formed in bearing sleeve 256 and interconnects an annular chamber 273 formed between the larger end of bearing sleeve 252 and nut 261. In operation slinger ring 271 supplies oil to the tapered surface of bearing sleeve 252, and the centrifugal force due to rotation of sleeve 252, and also by reason of a groove 254 in the tapered bearing, the oil is fed along the tapered surface toward the larger end, lubricating the tapered bearing surfaces as it passes, and is thrown against the flat face of washer 259, passing into radial grooves 260 for lubricating the end of bearing sleeve 252 in contact with washer 261, and then passes along grooves 260 into chamber 273 and return duct 272 back to reservoir 267. It will be seen, therefore, that efficient lubrication of bearing assembly 251 is automatically accomplished and that the only attention required is the maintaining of a supply of oil in reservoir 267.

Surface grinding wheel 230 and a novel wheel adapter assembly are mounted on the tapered end 275 of spindle 229 adjacent bearing assembly 251 and due to this novel bearing assembly is constrained to run true. While any suitable mounting means may be employed for mounting wheel 230 on spindle 229, the present invention contemplates a mounting assembly that will permit removal and replacement of the grinding wheel with full assurance that the grinding wheel will run true when replaced. As a consequence, the present practice of dressing a wheel every time it is removed and replaced is obviated. This novel mounting means comprises an adapter 276 having spaced, tapered spindle engaging portions 277 adapted to engage tapered section 275 of spindle 229 and a radially extending annular flange 278 having an axially extending rim 279 formed at one end and designed to engage a side face of surface wheel 230. The opposite end of adapter 276 is externally threaded at 282 and extends axially beyond the end of spindle 229 a slight distance as clearly shown in Figure 7. An outer wheel flange 283, having an axially extending rim 284 in alignment with rim 279 of adapter 276, fits over the adapter and secures surface wheel 230 on the hub of adapter 276 with rims 279 and 284 in clamping engagement with the side faces of wheel 230, and is secured in place by a nut 285 threaded on the end of the adapter.

Adapter 276 is retained on spindle 229 by means of a headless set screw 286 secured in the end of spindle 229 and a spindle nut 287 threaded on said set screw and seats in an annular recess 288 in adapter 276 with its face in engagement with a radially disposed annular shoulder 289 formed at the inner end of recess 288. Removal of wheel 230 and adapter 276 as a unit is readily effected by merely removing lock nut 287. It will be appreciated that no matter how many times this wheel assembly is removed and replaced the relationship between the wheel 230 and adapter 276 is never disturbed and that the spaced sloping spindle engaging portions 277 of adapter 276 will act as self-aligning and locating means to position adapter 276 and wheel 230 on the tapered end of spindle 229.

While in the construction previously described the essential working parts of the improved grinder of the present invention enable an operator to perform the desired work with extreme accuracy, the present invention also contemplates a novel belt guard 291 and a plurality of wheel guards for use with different types of wheels. Belt guard 291, as shown in Figures 2 to 4, comprises a belt guard casting 292 of substantially dished form having apertures 293, 294 and 295 to respectively receive the motor shaft 248, pivot screw 195 and its nut 197 and the end 244 of spindle 229 and the bearing securing nut 243. Guard casting 292 is secured to an upstanding post 296 integrally formed on frame F and to the end of spindle housing 199 at 296a by cap screws 297, one of which passes through an arcuate slot 298 (Figure 3) formed in casting 292. Arcuate slot 298 permits ready adjustment of casting 292 around the screw 297 in spindle housing 199 to clear the belt and pulleys of the grinder.

Referring to Figure 2, it will be seen that the inner surface of guard casting 292 around slot 298 and adjacent the end of spindle housing 199 is thickened to provide inwardly extending bosses 299 to reinforce the guard casting at these points so that the entire weight of the guard may be efficiently supported by the two cap screws 297. Guard casting 292 is also provided with spaced, threaded bosses 301 adapted to receive studs 302. Studs 302 are designed to support a cover 303 of dished form having stud receiving apertures 304 and having its peripheral wall 305 in overlapping relation to peripheral wall 306 of guard casting 292 thus avoiding the necessity of machining abutting surfaces of the guard casting and cover. Thumb nuts 307 threaded on the protruding ends of studs 302 secure cover 303 to guard casting 292. Several stop lugs 303a inside cover 303 engage the edge of guard casting 292 and maintain the two in proper spaced relationship.

A wheel guard 308 adapted for use with a surface wheel such as 230 is illustrated in Figures 1 to 4 and 7 of the drawings. Guard 308 is most clearly shown in Figures 2 and 7 wherein it is seen that the guard is made up of a dish-shaped casting 309 secured to the end of spindle housing 199 by cap screws 310 threaded into apertures 311, and a dish-shaped cover 312. Cover 312 as clearly seen in Figures 2 and 3 is secured to casting 309 at one end by means of a swivel pin 313 having a head 314. Swivel pin 313 has a swivelling fit in ear 315 of cover 312 and is secured in aligned ear 316 of casting 309 by means of a set screw (not shown). At its other end ear 315 of cover 312 is provided with an arcuate slot 317 designed to freely receive the shank of a thumb nut 318 threaded onto a stud secured to casting 309. The head of thumb nut 318 is designed to engage the face of ear 316 when it is tightened so as to clamp cover 312 in its closed position. It will be obvious that removal of wheel 230 or tightening of nut 285 or spindle screw 286 may be readily accomplished by merely loosening thumb screw 318 and rotating cover 312 upwardly around swivel pin 313 so as to expose the interior of guard 308. Since peripheral wall 321 of cover 312 overlaps peripheral wall 322 of casting 309, sparks are prevented from coming through guard 308 and this pivotal movement of cover 312 can be accomplished without interference or removal of any parts and eliminates the necessity of machining surfaces of cover 312 for abutting engagement with casting 309. As clearly seen in Figure 2, swivel pin 313 is tapped at 323 adapting it for the mounting of a conventional surface alignment indicator (not shown).

The various grinding wheels, such as surface wheel 230 and cup wheels (not shown), may be dressed after assembly on spindle 229 by use of the novel dressing fixture 351 of this invention. Referring to Figure 14, fixture 351 comprises a block 352 having a notch 353 cut in one corner to provide right angularly disposed flanges 354 and 355. Each of these flanges is provided with a bolt receiving slot 356 and the side faces of the block 352 containing slots 356 are accurately machined at right angles to assure proper seating on work-supporting surface 102. The end of block 352 opposite the end containing notch 353 is provided with a slanting circular opening 357 adapted to receive a dressing tool 358 and support it in proper position for dressing. A set screw 359 threaded into a threaded bore 360 secures tool 358 in block 352.

In using fixture 351 for dressing surface wheels, table C is locked by bringing both stops 126 up against stop screw 85. Fixture 351 is positioned on surface 102 of table C as shown in Figure 14 with the dressing tool in front of the vertical center line through the wheel. A T-bolt and nut assembly 361 fitting in T-slot 103 of table C and slot 356 of flange 354 locks fixture 351 in its adjusted position. With the table C locked and fixture 351 secured to surface 102 of table C as just described, motor 201 is started and hand wheel 61 is operated to traverse the table causing tool 358 to pass across the edge of wheel 230 to effect the desired dressing.

In dressing cup wheels, fixture 351 is secured to surface 102 with flange 355 in engagement with surface 102 and tool 358 in a horizontal position and slanting toward the right hand end of table C as viewed in Figure 2. Tool 358 is disposed in front of the vertical center line of the wheel as in the grinding of surface wheels and both tables are locked. The wheel is fed up and down across tool 358 by means of hand wheel 152. It will be appreciated, therefore, that by the use of this simple fixture proper dressing of surface and cup wheels mounted on spindle 229 can be readily effected.

Arm 214 is also adapted to receive a light bracket 371 (Figure 1). Bracket 371 is secured to arm 214 by means of cap screws (not shown) threaded into apertures 372 and is provided with an arm 373 which in turn carries a light 374 at the end of a flexible supporting tube 375. An adjustable shade 376 is provided to shield the light from the operator's eyes. Due to the flexibility of tube 375 and the adjustable shade 376, light 374 may be positioned in any desired position to assure adequate illumination of the work without shining in the eyes of the operator, and is adjustable up and down with slide E. Since this light assembly is disclosed and claimed in a co-pending application and does not form a part of the present invention, it will not be further described.

While we have disclosed the invention as being applied to a surface grinder, it is not limited to such use and may be employed with various attachments to carry out a wide variety of grinding operations. For instance, a universal vise may be attached to the table and chip breaker grinding carried out, or an attachment for mounting tools or cutters between centers may be mounted on the table if desired, and attachments of this character, including modified wheel guards to accommodate various types of grinding wheels, form the subject matter of further applications about to be filed by us.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a grinder, a base having spaced upstanding, longitudinally extending parallel lands and a circular land disposed adjacent an end of one of said longitudinally extending lands; a column secured to said base and having a portion engaging said circular land; a grinding wheel and a driving mechanism therefor mounted on said column; a traversing table having parallel surfaces engaging said longitudinal lands and slidable thereover toward and away from said column; means, independent of said lands, for guiding said table for rectilinear movement along said longitudinally extending lands; and a work-supporting table mounted on said traversing table for sliding movement thereon transversely to said traversing table, for feeding a work-piece toward and away from said wheel.

2. The combination defined in claim 1, wherein the traversing table is provided with spaced, upstanding, longitudinally extending lands disposed at right angles to the longitudinally extending lands of said base and said work-supporting table is adapted to slide thereon.

3. The combination defined in claim 1, wherein said base is provided with an aperture concentrically disposed with respect to said circular land and said column has a formation at its lower end extending into said aperture, whereby the column is mounted on said base for swivelling movement in said aperture in bearing engagement with said circular land.

4. In a machine tool, a base having a pair of parallel flat surfaced horizontal guides and a parallel flat surfaced vertical guide; a table mounted on said base and having mating surfaces slidably coacting with said guides; means for causing said table to slide over said horizontal guides in a direction exactly parallel to said vertical guide, comprising a gib mounted on said base and engaging a vertical surface on said table paralleling said vertical surface on said base; and means for maintaining said gib in engagement with said vertical surface.

5. The machine tool defined in claim 4, together with means for forcing said gib into frictional locking engagement with said vertical surface on said table, for locking said table to said base.

6. In a machine tool, a support for mounting a table for sliding movement in a horizontal plane, comprising spaced, upstanding, longitudinally extending lands formed on the support and having their upper surfaces ground to provide slides disposed in a common plane; a guideway formed in one of said lands and extending from end to end thereof and having at least one of its side walls accurately formed to guide said table along the desired path; a traversing table having depending, longitudinally extending lands formed thereon with their lower surfaces ground to provide slides disposed in a common plane and adapted to slidingly cooperate with said first-mentioned slides, a guide bar on one of the depending lands of said table adapted to fit freely into said guideway, with one of its side faces in sliding engagement with said one side wall, a gib disposed between said other of said side walls and said guide bar; and means engaging said gib and forcing it into sufficiently snug sliding relationship with the other of said side faces to cause said guide bar to bear against said one side wall throughout its length whereby said table is forced to move in a path determined by the surface of said one of said side walls.

7. In a machine tool, a base having spaced, upstanding, longitudinally extending, parallel lands forming slides disposed in a common plane; a guideway in one of said lands extending from end to end thereof in a direction parallel to said lands and having at least one vertically extending wall; a traversing table having spaced, depending, parallel lands on its under face forming slides disposed in a common plane adapted to respectively cooperate with the slides of said base; a guide bar removably secured to one of said depending lands and designed to extend into said guideway and slidingly engage said one vertically extending, parallel wall; a gib disposed in said guideway between said other wall and said guide bar; means for forcing said gib into contact with said guide bar to cause said guide bar to bear against said one of said side walls throughout its entire length, whereby said traversing table is constrained to move along a path determined by said one vertically extending, parallel wall; means carried by said base for moving said traversing table in both directions along said path; said traversing table also having spaced, upstanding, parallel lands on its upper face extending at right angles to said depending lands forming slides disposed in a common plane parallel to said last-mentioned slides; a guideway in one of said second-mentioned spaced, upstanding, parallel lands and having at least one vertically extending wall parallel to the axes thereof; a work table having spaced, depending, parallel lands on its under face forming slides disposed in a common plane adapted to respectively cooperate with the slides formed by said upstanding lands of said traversing table and having a work-supporting surface disposed in a plane parallel to said last-mentioned slides; a guide bar removably secured to one of said last-mentioned depending lands and designed to extend into said last-mentioned guideway and slidingly engage said last-mentioned one vertically extending, parallel wall; a gib disposed in said last-mentioned guideway between said other wall and said last-mentioned guide bar; means acting upon said last-mentioned gib for causing said last-mentioned guide bar to bear against said one of said side walls throughout its entire length, whereby said work table is constrained to move along a path determined by said last-mentioned one vertically extending, parallel wall; means carried by said traversing table for moving said work table in both directions along said last-mentioned path; said guides and slides cooperating to provide a T-square table assembly wherein the tables are constrained to move in paths at right angles to each other and said work surface moves in a plane parallel to the common plane determined by the slides formed on the base.

8. The combination defined in claim 7, wherein said last-mentioned guide bar is provided with a longitudinally extending upwardly facing guide face and at least one guide device is carried by said traversing table and cooperates with said guide face to prevent tilting of said work table when moved to its extreme positions with work thereon whose center of gravity lies outside the table surface.

9. A base and traversing table assembly for use in grinders or like machine tools, comprising a base having spaced parallel guiding means and a slot between said guiding means disposed substantially parallel thereto; a crosswise adjustment screw journalled in said base in offset relation to said slot; a traversing table slidably mounted on said guiding means; a substantially L-shaped bracket secured to said table and extending through said slot, with one leg disposed beneath said base and carrying means threadedly engaging said crosswise adjustment screw; and means for actuating said crosswise adjustment screw, for moving said traversing table along said guiding means.

10. In a machine tool, a base; a table mounted for sliding movement on said base, a feed screw for moving said table over said base mounted for rotation in a bearing sleeve snugly seating in an opening in said base; means on said screw for limiting endwise movement thereof with respect to said bearing sleeve and being of sufficiently small diameter to pass through said opening in said base, and means for releasably locking said bearing sleeve in said opening.

11. A table adjustment screw assembly for use in grinders or like machine tools comprising a shaft designed to support the adjustment screw assembly for installation as a unit and having a feed screw portion extending from one end to a point intermediate its ends, a stop collar secured to said shaft at a point beyond said feed screw portion; a bearing collar, rotatably mounted on said shaft, and having a diameter slightly larger than said stop collar, with one end disposed in abutting relation to said stop collar; an outwardly extending annular flange on the other end of said bearing collar adapted to locate said bearing collar in a supporting seat; a second stop collar secured to said shaft in abutting engagement with said other end of said bearing collar; a stop screw threaded into said bearing collar intermediate its ends for locking said bearing collar against rotational and axial movement in its supporting seat; an adjustment screw dial secured to said shaft and having a pocket in one end for receiving said second stop collar and providing a peripheral flange adapted to cooperate with indicia means to provide a micrometer gauge for adjusting said feed screw; and a hand wheel secured to said shaft.

12. In a grinder, a base; means on said base adapted to support a work-piece; a vertical column mounted on said base; a slide member mounted for vertical sliding movement on said column and supporting a grinding wheel and its driving mechanism; means for locking said slide member to said column at any desired level; and means for accurately guiding said slide member in its vertical sliding movement comprising a vertical guide bar removably secured to said column and having accurately formed vertical side faces; a cooperating guideway formed in said slide member having an accurately formed vertically extending side wall slidingly engaging one side face of said guide bar; a gib disposed between the other side face of said guide bar and the other side wall of said guideway; and means for adjustably forcing said gib into snug sliding cooperation with said other side face and for locking said gib in adjusted position, to constrain said slide member for vertical sliding movement in a path determined by said one vertical side face.

13. The combination defined in claim 12, wherein said base is also provided with an aperture snugly receiving the lower end of said column, and an area of the upper surface of said base around said aperture is accurately formed to provide an annular seating surface tightly engaging an annular flange on said column, for supporting the latter in a true vertical plane, and means, including a bolt extending upwardly through said column, for locking said column against axial and rotational movement on said base.

14. A support for a grinding wheel or similar machine tool and its driving mechanism, comprising a base; a column supported on said base with its axis in a plane normal to the plane of the base; a slide member supported on said column for axial sliding movement along said column; a cap mounted on the upper end of said column; means interconnecting said slide member and said cap for moving said slide member along said column; a frame supported on said slide member and adapted to support a grinding wheel and its driving mechanism; and common means for accurately locating said cap and slide member in predetermined angular relationship to each other and also with respect to said column, comprising a guide bar secured to said column and slidably engaging said slide member and fitting into a recess in said cap.

15. The combination defined in claim 14, wherein said slide member has a groove freely receiving said guide bar and said groove has at least one accurately formed side wall engaging a face of said guide bar and providing a space for receiving a gib between its other wall and said other face of said guide bar, and means is provided for forcing said gib toward said guide bar, for constraining said slide member for sliding movement along said column in a path determined by said guide bar.

16. In a grinding machine having a horizontally movable work table, a vertical column at one side of said work table, and grinding mechanism supported on said column for vertical movement; a mechanism supporting slide member surrounding said column and vertically split along one side to render it circumferentially contractible and expansible; adjustable means on said slide member operative to adjust the size of said member to provide a close sliding fit with said column and compensate for wear between said column and slide member; means for locking said adjustable means in adjusted position; and manually operable means also carried by said slide member operative to lock said slide member in any desired position along said column against movement relative to said column.

17. In a grinding machine having a horizontally movable work table, a vertical column at one side of said work table, and grinding mechanism supported on said column for vertical movement in a path normal to the plane of said work table; a slide member, vertically split along one side from end to end to render it circumferentially contractible and expansive, surrounding said column and supporting said grinding mechanism; adjustable means on said slide member adjacent one end of said split for contracting said slide member to provide a close sliding fit with said column and compensate for wear between said column and slide member thereby accuring movement of said grinding mechanism in a path normal to said plane of said work table; locking means for retaining said adjustable means in adjusted position; and a manually operable means also carried by said slide member and disposed adjacent the other end of said split for further contracting at least a portion of said slide member to lock it in the desired position along said column against movement relative to said column.

18. In a machine tool, a support; a frame mounted for rocking movement about a substantially horizontal axis on said support; a tool spindle journalled on said support for rotation about an axis parallel to said horizontal axis; an arm on said support overlying said spindle; an adjusting screw threaded into said arm and engaging said frame at a point substantially in vertical alignment with said spindle and on an arc having said horizontal axis as a center and passing substantially through the axis of said spindle whereby said frame may be rocked to advance said tool toward the work with a minimum of sliding between said screw and the frame thereby effecting a substantially equal vertical movement of said tool spindle and said adjusting screw toward the work upon actuation of said adjusting screw.

CHRISTY A. WIKEN.
ERIC A. REIBIG.